US006782537B1

(12) United States Patent
Blackmore et al.

(10) Patent No.: US 6,782,537 B1
(45) Date of Patent: Aug. 24, 2004

(54) ESTABLISHING A COMMUNICATOR ACROSS MULTIPLE PROCESSES IN A MULTITHREADED COMPUTING ENVIRONMENT

(75) Inventors: Robert Blackmore, Poughkeepsie, NY (US); Richard R. Treumann, Highland, NY (US); Alison B. White, Kingston, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/404,381

(22) Filed: Sep. 23, 1999

(51) Int. Cl.[7] .............................. G06F 3/00; G06F 9/44; G06F 9/46; G06F 13/00
(52) U.S. Cl. ....................... 719/313; 718/106; 718/107; 719/328
(58) Field of Search ................................. 709/102, 314, 709/318, 103, 100, 245, 101, 313, 315, 316, 317, 328; 370/392; 711/133, 141; 712/6; 718/106, 107; 719/313

(56) References Cited

U.S. PATENT DOCUMENTS

| | | | |
|---|---|---|---|
| 4,584,639 A | 4/1986 | Hardy | 364/200 |
| 5,210,874 A | 5/1993 | Karger | 395/650 |
| 5,261,053 A * | 11/1993 | Valencia | 711/133 |
| 5,280,614 A | 1/1994 | Munroe et al. | 395/650 |
| 5,339,415 A * | 8/1994 | Strout et al. | 709/102 |
| 5,390,310 A | 2/1995 | Welland | 395/400 |
| 5,428,803 A * | 6/1995 | Chen et al. | 712/6 |
| 5,481,706 A | 1/1996 | Peek | 395/650 |
| 5,485,626 A * | 1/1996 | Lawlor et al. | 709/314 |
| 5,528,761 A * | 6/1996 | Ooba et al. | 709/237 |
| 5,664,170 A | 9/1997 | Taylor | 395/200 |
| 5,809,554 A | 9/1998 | Benayon et al. | 711/171 |
| 5,845,129 A | 12/1998 | Wendorf et al. | 395/726 |
| 5,864,683 A | 1/1999 | Boebert et al. | 395/200.79 |
| 5,890,007 A * | 3/1999 | Zinguuzi | 712/6 |
| 6,125,399 A * | 9/2000 | Hamilton | 709/245 |
| 6,209,064 B1 * | 3/2001 | Weber | 711/141 |
| 6,269,390 B1 * | 7/2001 | Boland | 709/100 |
| 6,332,167 B1 * | 12/2001 | Peters et al. | 709/318 |
| 6,412,018 B1 * | 6/2002 | Tuel, Jr. | 709/313 |
| 6,415,332 B1 * | 7/2002 | Tuel, Jr. | 709/313 |
| 6,487,580 B1 * | 11/2002 | Bobak et al. | 718/106 |
| 6,529,932 B1 * | 3/2003 | Dadiomov et al. | 718/101 |
| 6,535,929 B1 * | 3/2003 | Provino et al. | 719/321 |
| 6,601,089 B1 * | 7/2003 | Sistare et al. | 709/213 |
| 6,647,423 B2 * | 11/2003 | Regnier et al. | 709/229 |
| 6,718,398 B1 * | 4/2004 | Dontje et al. | 719/312 |

* cited by examiner

Primary Examiner—Ayaz Sheikh
Assistant Examiner—Christian LaForgia
(74) Attorney, Agent, or Firm—Lawrence D. Cutter, Esq.; Floyd A. Gonzalez, Esq.; Heslin Rothenberg Farley & Mesitit P.C.

(57) ABSTRACT

A deterministic, non-deadlocking technique to achieving distributed consensus in a multithreaded multiprocessing computing environment is provided. A communicator is established across multiple processes in the multithreaded computer environment notwithstanding that multiple groups of threads may be simultaneously trying to establish communicators. The technique includes communicating across the multiple processes to establish a candidate identifier for the communicator for a group of participating threads of the multiple processes; and communicating across the multiple processes to check at each participating thread of the multiple processes whether the candidate identifier can be claimed at its process, and if so, claiming the candidate identifier as the new identifier thereby establishing the communicator. As one example, the technique can be implemented via a subroutine call within a message passing interface (MPI) library.

34 Claims, 4 Drawing Sheets fig. 1 fig. 2 fig. 3A fig. 3B

ESTABLISHING A COMMUNICATOR ACROSS MULTIPLE PROCESSES IN A MULTITHREADED COMPUTING ENVIRONMENT

TECHNICAL FIELD

This invention relates to capabilities for managing shared resources in a computer system, and more particularly, to a thread-safe distributed consensus technique, for example, for implementation within a message passing interface (MPI) library.

BACKGROUND OF THE INVENTION

In order to better understand the background of the subject invention, explanation of certain terminology is first provided. A term well-known in the art as a symmetric multi-processor (SMP) refers to an aspect of hardware in a computing system and, more particularly, relates to the physical layout and design of the processor planar itself. Such multiple processor units have, as one characteristic, the sharing of global memory as well as equal access to input/output (I/O) of the SMP system.

Another term which is commonly associated with modern complex computing systems is a "thread". The term "thread" in a general sense refers merely to a simple execution path through application software and the kernel of an operating system executing with a computer. As is well understood in the art, it is commonplace for multiple such threads to be allowed per a single process image.

A thread standard has now been incorporated into the POSIX standard. Basic thread management under the POSIX standard is described, for example, in a publication by K. Robbins and S. Robbins entitled *Practical UNIX Programming—A Guide to Concurrency, Communication and Multi-Threading*, Prentice Hall PTR (1996).

Another concept which is utilized herein in describing an embodiment of the invention is one of "locks". It is typical in modern computing systems to have critical sections of code or shared data structures, such as shared libraries, whose integrity is extremely important to the correct operation of the system. Locks are, in general, devices employed in software (or hardware) to "serialize" access to these critical sections of code and/or shared data structures.

One other term to note is the concept of code being multithread-safe. Code is considered to be thread/MP-safe if multiple execution threads contending for the same resource or routine are serialized such that data integrity is ensured for all threads. One way of effecting this is by means of the aforementioned locks.

By way of further background, the message passing interface (MPI) standard defines the following semantic: that processes in a parallel job exchange messages within a communication domain (also referred to herein as a "communicator") which guarantees the integrity of messages within that domain. Messages issued in one domain do not interfere with messages issued in another. Once the parallel job begins, subsets of the processes may collaborate to form separate communication domains as needed.

Applicants recognize that a problem arises in a multi-thread environment wherein multiple threads may concurrently be trying to obtain a communication domain. Without a way to address this issue, deadlock could occur. Thus, a deterministic, non-deadlocking technique to achieving a distributed consensus in a multithreaded processing system is needed. The present invention is provided as one technique for addressing this need.

DISCLOSURE OF THE INVENTION

To briefly summarize, presented herein in one aspect is a method for establishing a communicator across multiple processes of a multithreaded computer environment wherein multiple threads may be simultaneously trying to establish communicators. The method includes: communicating across the multiple processes to establish a candidate identifier for the communicator for a group of participating threads spread over the multiple processes; and communicating across the multiple processes to check at each participating thread of the multiple processes whether the candidate identifier can be claimed at its process, and if so, claiming the candidate identifier as a new identifier thereby establishing the communicator.

In another aspect, a system is provided for establishing a communicator across multiple processes in a multithreaded computer environment wherein multiple threads may be simultaneously trying to establish communicators. The system includes means for communicating across the multiple processes to establish a candidate identifier for the communicator for a group of participating threads spread over the multiple processes; and means for communicating across the multiple processes to check at each participating thread of the multiple processes whether the candidate identifier can be claimed at its process, and if so, claiming the candidate identifier as a new identifier thereby establishing the communicator.

In a further aspect, the invention comprises at least one program storage device readable by a machine, tangibly embodying at least one program of instructions executable by the machine to perform a method for establishing a communicator across multiple processes in a multithreaded computer environment wherein multiple threads may be simultaneously trying to establish communicators. The method includes: communicating across the multiple processes to establish a candidate identifier for the communicator for a group of participating threads spread over the multiple processes; and communicating across the multiple processes to check at each participating thread of the multiple processes whether the candidate identifier can be claimed at its process, and if so, claiming the candidate identifier as a new identifier thereby establishing the communicator.

To restate, a technique is presented herein for achieving distributed consensus in a multithreaded multiprocess computing environment. The technique is deterministic since the threads will succeed in creating a communicator in a bounded number of retries and in a predictable order. This is believed advantageous over so called "randomized" algorithms in which threads that fail to create a communicator simply wait for a random amount of time before retrying. In addition, the technique presented herein is guaranteed to avoid deadlock between threads. This is advantageous over other algorithms which detect a deadlock situation and then take action to break the deadlock. Deadlock detection typically involves noticing that some period of time has elapsed in which no thread is proceeding. The distributed consensus capability presented herein is efficient since there is an upper bound on the number of times a thread is forced to retry to achieve distributed consensus for a new communication domain notwithstanding the existence of multiple groups of threads trying simultaneously to create communicators.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
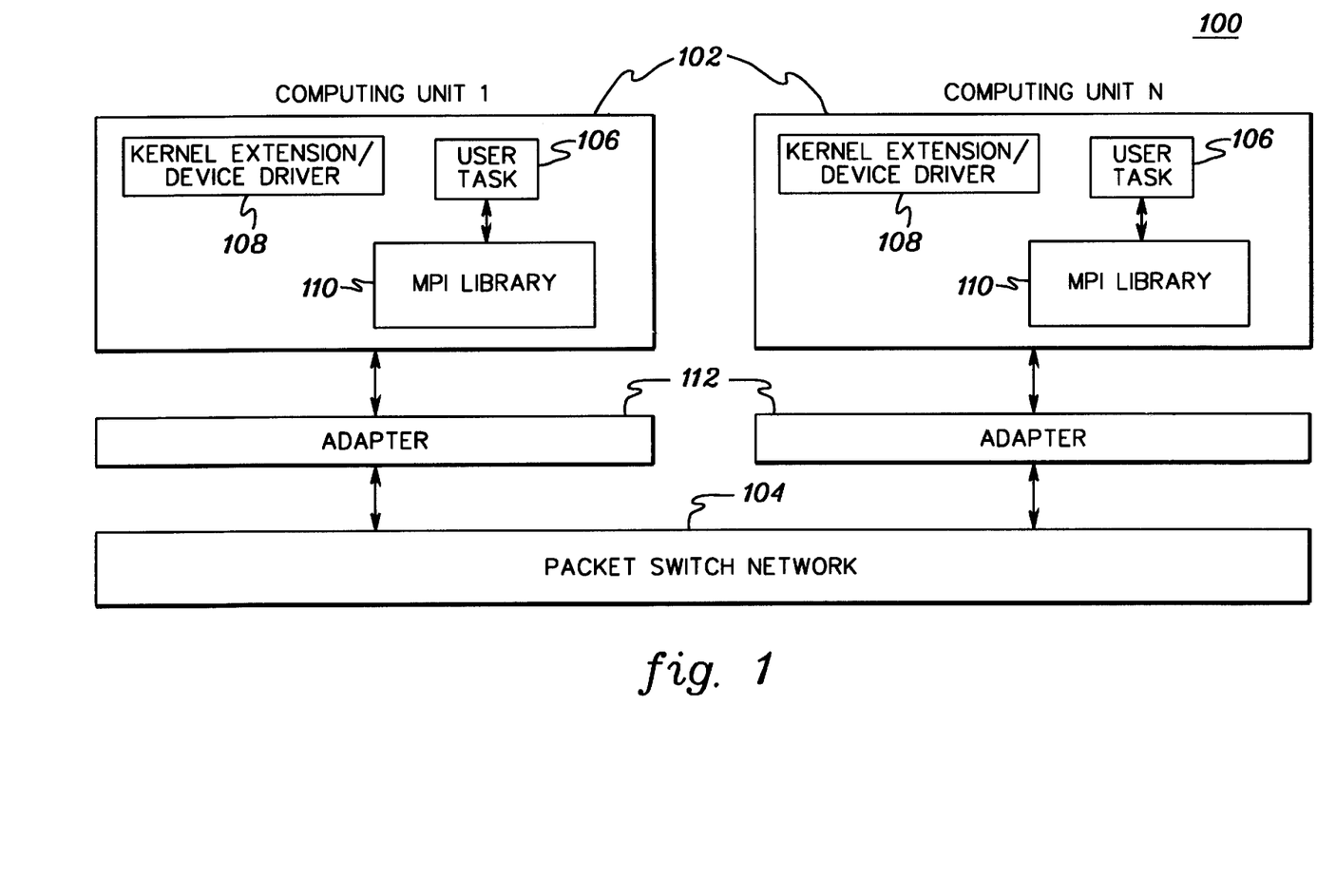
FIG. 1 depicts one example of a threaded computer environment incorporating communication domain consensus capabilities in accordance with the present invention.

One example of a threaded computer environment incorporating and using the capabilities of the present invention is described below with reference to FIG. 1.

As shown, a computer environment 100 includes a plurality of computing nodes 102 coupled to one another via a connection 104. As one example, each computing node may comprise a node of an RS/6000 SP System offered by International Business Machines Corporation, and connection 104 may be a packet switch network, such as the SP switch or high performance switch (HPS), also offered by International Business Machines Corporation. Note again, FIG. 1 is presented by way of example only. The techniques disclosed herein could apply to any set of single threaded or multithreaded programs running on a single machine in addition to the multiprocessor environment depicted in FIG. 1.

Within environment 100, message packets are passed from a source computing node (sender) to a receiver computing node (receiver) via packet switch network 104. For example, a user task 106 of computing unit N may pass a message to a user task 106 of computing unit 1 (receiver). Adapters 112 couple computing units 102 to switch 104. One example of switch 104 is described in detail in "IBM Parallel System Support Programs For AIX Administration Guide," Publication No. GC23-3897-02 (1996).

As further explanation, communication between a computing unit and its associated adapter 112 is, for instance, described by an interface that includes functions, such as, open communication, close communication, enable route, disable route, return status, and reset adapter. In one embodiment, the interface comprises a message passing interface (MPI) 110, also referred to herein as an MPI library.

Access to the adapter is mediated by a kernel extension/device driver 108 within each computing unit 102. Extension 108 includes a set of functions that have the authority of the operating system itself (e.g., the AIX operating system offered by International Business Machines Corporation). The kernel extension authorizes use of adapter 112 by user task 106 (or a program) and has the capability of interrupting the user task, if desired. User task 106 communicates with adapter 112 through the MPI library 110. The MPI library is described in greater detail in, for example, an International Business Machines Corporation publication entitled "IBM Parallel Environment for AIX: MPI Programming and Subroutine Reference," Version 2, Release 4 (October, 1998), the entirety of which is hereby incorporated herein by reference.

International Business Machines Corporation's implementation of the MPI library is described in detail in various additional publications. For example, reference an article in the IBM Systems Journal entitled "The Communication Software In Parallel Environment Of The IBM SP2," Vol. 34, No. 2, pp. 205–215 (1995). Further information is available in a textbook by W. Richard Stevens entitled UNIX Network Programming, published by Prentice Hall, Inc. (1990). Both of these references are hereby incorporated by reference in their entirety.

As noted, it is assumed herein that the computing environment comprises a threaded computer environment so that the user task may comprise multiple threads, and the library is a threaded MPI. A threaded computer environment is today well-known in the industry. A threaded MPI library is available from International Business Machines Corporation as "IBM Parallel Environment for AIX," Version 2, Release 4, IBM Product No. 5765-543 (October 1998). This threaded MPI comprises a licensed program product which runs on the AIX system.

Before discussing one detailed embodiment of the present invention, the following definitions are provided by way of background:

A "parallel job" is a set of tasks executing on a collection of processors. The tasks cooperate and exchange data in order to solve a problem jointly.

A "task" or "process" is an instance of an executing program (sequence of instructions), comprised of an address space and one or more flows of control. An address space is the set of memory locations that a task may reference or access.

A "thread" is a flow of control within a task. Most systems today support multiple flows of control within a single task. The threads may execute concurrently.

An "MPI communicator" is a logical entity consisting of a group of communicating tasks. In one example, a communicator can be implemented with an identifier called the context ID.

A "context ID" or "context identifier" is a number which is identical across the tasks which comprise a specific MPI communicator, and unique with respect to any other communicator on any task involved in that communicator.

A "communication domain" is the context in which the tasks comprising a communicator exchange messages. It has the property of insularity, in that no message sent within the domain will be delivered to a task outside the domain (i.e., in a different communicator). Communication domain and communicator are used interchangeably herein.

A "reduce" or "reduction" operation is an operation (e.g., SUM, BITWISE AND) performed on a set of values, where one value is provided by each member of a set of communicating tasks in a parallel job. The results of the operation may be returned in a single process (reduce operation) or to all participating processes (allreduce operation).

To manage the separation of communication domains, one implementation of a MPI library associates each communication domain with unique "context ID" which is agreed upon by job processes in the domain. An MPI library routine whose purpose is to create a new communication domain may be called by subsets (i.e., threads) of the processes of a parallel job. The library routine must form the new domain by identifying and claiming a common context ID that is unique across all processes in the domain and available at all processes in the subset. The call to create a new communication domain may be made simultaneously by several groups of threads, some of which may be in the same process or different processes.

Figure 2:
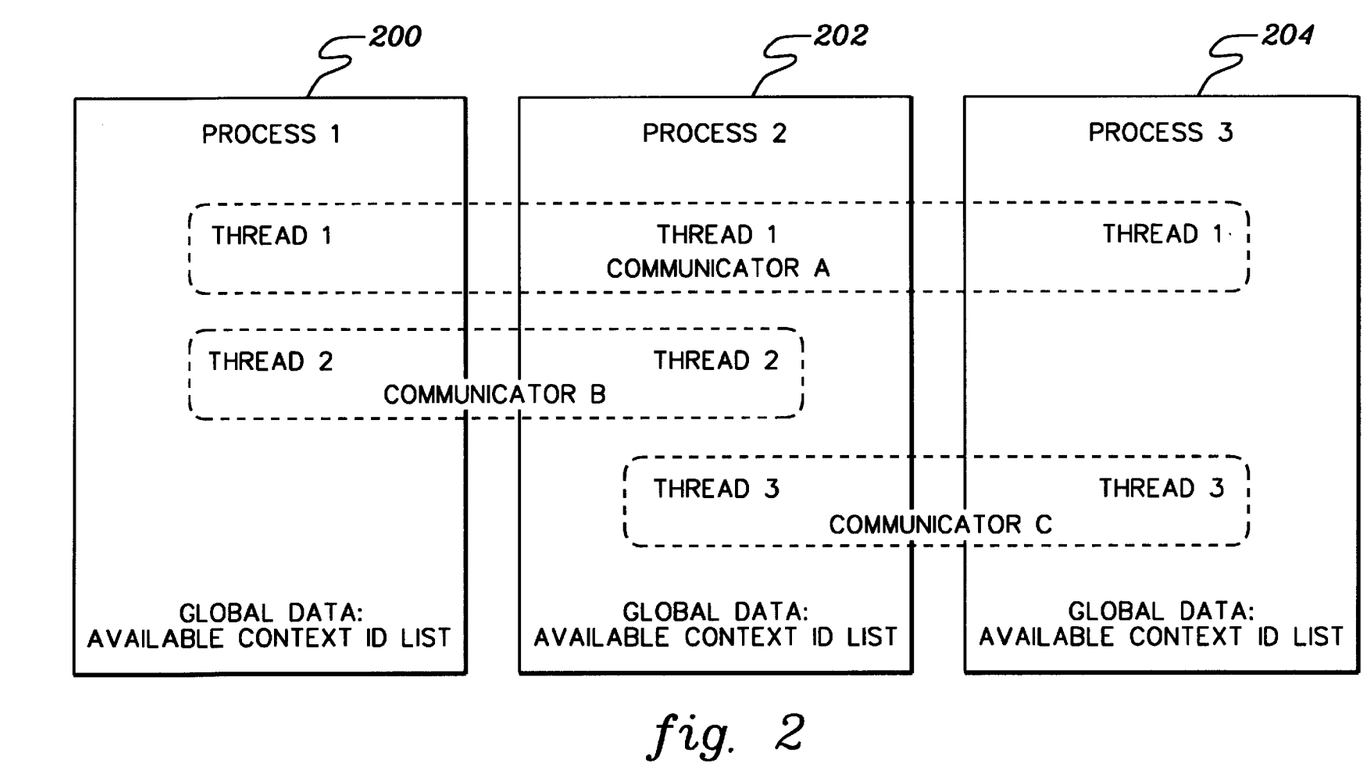
FIG. 2 is a simplified diagram of multiple processes having multiple threads wherein multiple communication domains are established across the multiple threads of the multiple processes in accordance with the principles of the present invention.

FIG. 2 illustrates a scenario wherein each thread 1 on three processes 200, 202, 204 (process 1, process 2 & process 3), calls the MPI library to form communicator A, threads 2 on processes 1 & 2 call the MPI library to form communicator B, and threads 3 on processes 2 & 3 call the MPI library to form communicator C. At any given process, the calls can occur in arbitrary order. MPI semantic requires that all threads make progress, and that each library call eventually return.

The problem is to select a unique context ID for each new communication domain in the presence of multiple groups of threads, which may concurrently be trying to obtain one of the available IDs. Access to global data such as a list of context IDs must be serialized in a multithreaded library. However, no thread may hold a lock during the communication phase needed for the processes to identify a common context ID because the job may deadlock.

Thus, generally stated, presented herein is a method for avoiding deadlock while establishing a communicator across multiple processes in a multithreaded computer environment, wherein multiple threads may be simultaneously trying to establish communicators. A communicator is considered to be established when the threads which are attempting to establish the communicator have agreed upon a value (context ID) that is unique across the processes which contain the participating threads.

The method employs two phases. In phase one, a candidate context ID (also referred to herein as a candidate identifier) is established among the threads which are attempting to create the communicator. In phase two, each participating thread checks whether the candidate context ID can be claimed at its process and if so, attempts to claim the context ID and reports the result of this operation to the other participating threads. To avoid deadlock, the threads of the processes attempting to establish communicators are put into a priority queue at each process which controls which thread in the process has the right to claim a context. These threads are prioritized, in one example, based upon a current context identifier from which the thread is calling for the new communicator. If any thread reports a failure during phase 2, the method begins again with phase 1 selection of a new candidate context ID.

More particularly, in accordance with the present invention, the MPI library maintains at each process in the parallel job a list of free context IDs (also referred to herein as the "global context list"), which are scalars. This context ID list is global to the process, and thread access to it is serialized by a lock. At the time that an MPI job is initiated, all participating processes are single-threaded and belong to a single communication domain which is assigned, for example, the smallest context ID. After initialization, each thread of any set of threads that calls the library to create a new communication domain does so in the context of an existing domain. In one aspect of the present invention, the context identifier of this existing domain is used to prioritize the assignment of new context IDs as described further below.

Context IDs under which a request for a new communication domain has been issued are put into a sorted list (the "priority list") which is global to the process and accessed under lock. The thread which has made a request under the smallest context ID will be first in the priority list and thus will be the thread which is allowed to update the global context list at that process.

Consensus on a final context ID (also referred to herein as the new context ID) requires a minimum of two rounds of communication. A first round of communication produces a candidate context ID (candidate identifier), and ensures that all processes in the current domain are participating in the subroutine call (i.e., the call may be delayed or blocked on some processes). Once it is known that all processes are participating, each thread inserts its current context ID into its process's priority list (also referred to as the priority queue). At any given process, the candidate context ID may have been claimed by another thread while the lock was released during the first round of communication, so the next step is to check whether the candidate context ID can be claimed at all participating processes, in which case consensus may be achieved. If the candidate identifier is still available, and the thread is first (i.e., has priority) in the priority list, the thread updates (i.e., removes) the candidate identifier from the global context list, thus "claiming" the candidate identifier as the new identifier. If the thread is not first in the priority list, the thread releases the lock and waits on a condition variable. The second round of communication proceeds, and if it shows that the candidate identifier could not be claimed at some process, then any thread which updated its process's global context identifier list backs out the update (i.e., adds the previously removed candidate identifier back into the list). If the candidate identifier was claimed at all processes, then the successful threads delete their current context identifiers from the priority list and wake up any waiting threads.

A thread which waits because the thread does not have highest priority in the priority queue resumes processing at the point where the global context identifier list is checked to see whether the candidate identifier is still available. A thread for which consensus failed because a participating thread could not claim the candidate identifier at its respective process continues at the first round of communication to select a new candidate identifier.

Figure 3A:
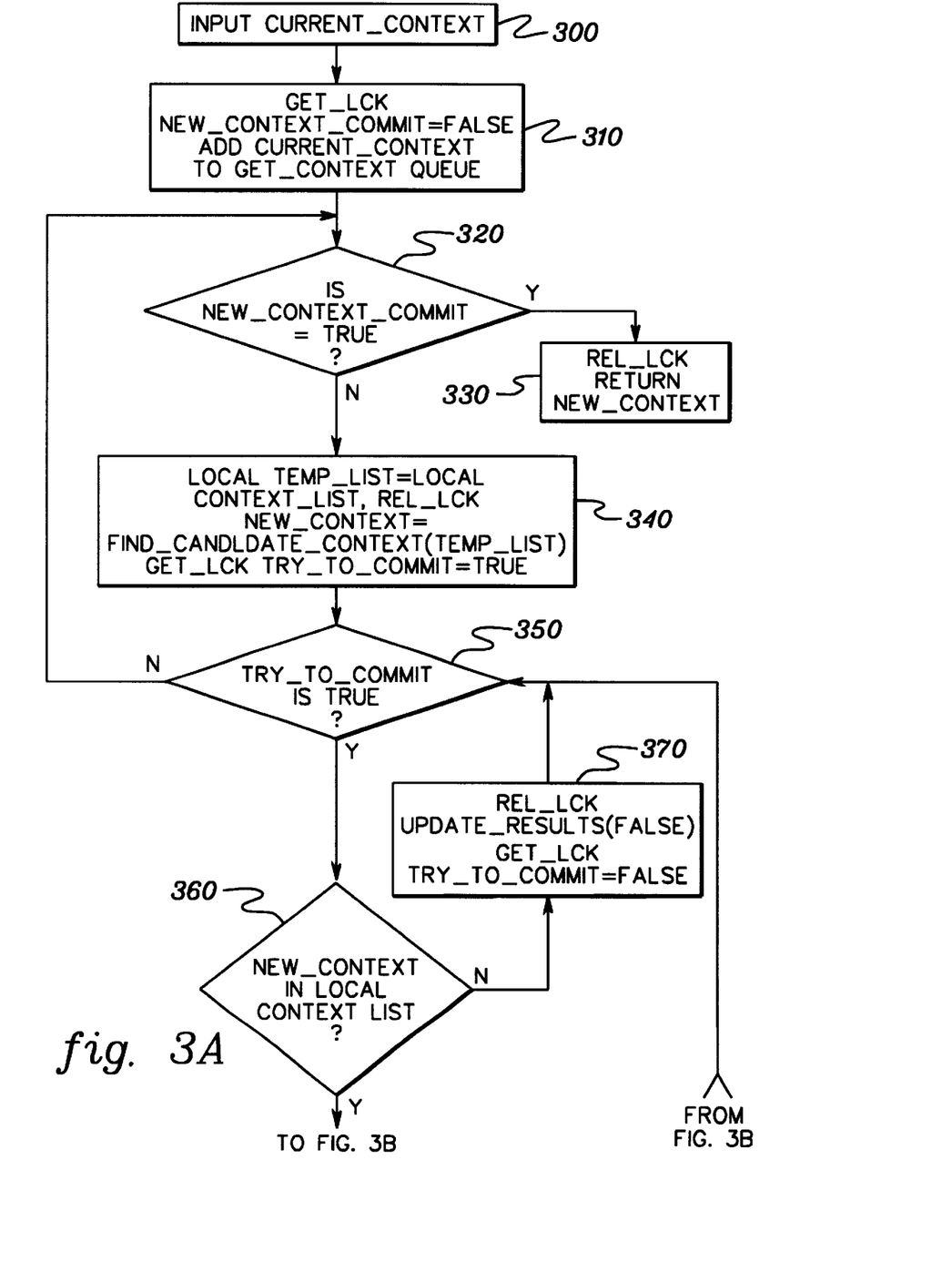
FIGS. 3A & 3B depict one embodiment of a communication domain consensus technique in accordance with the principles of the present invention.
Figure 3B:
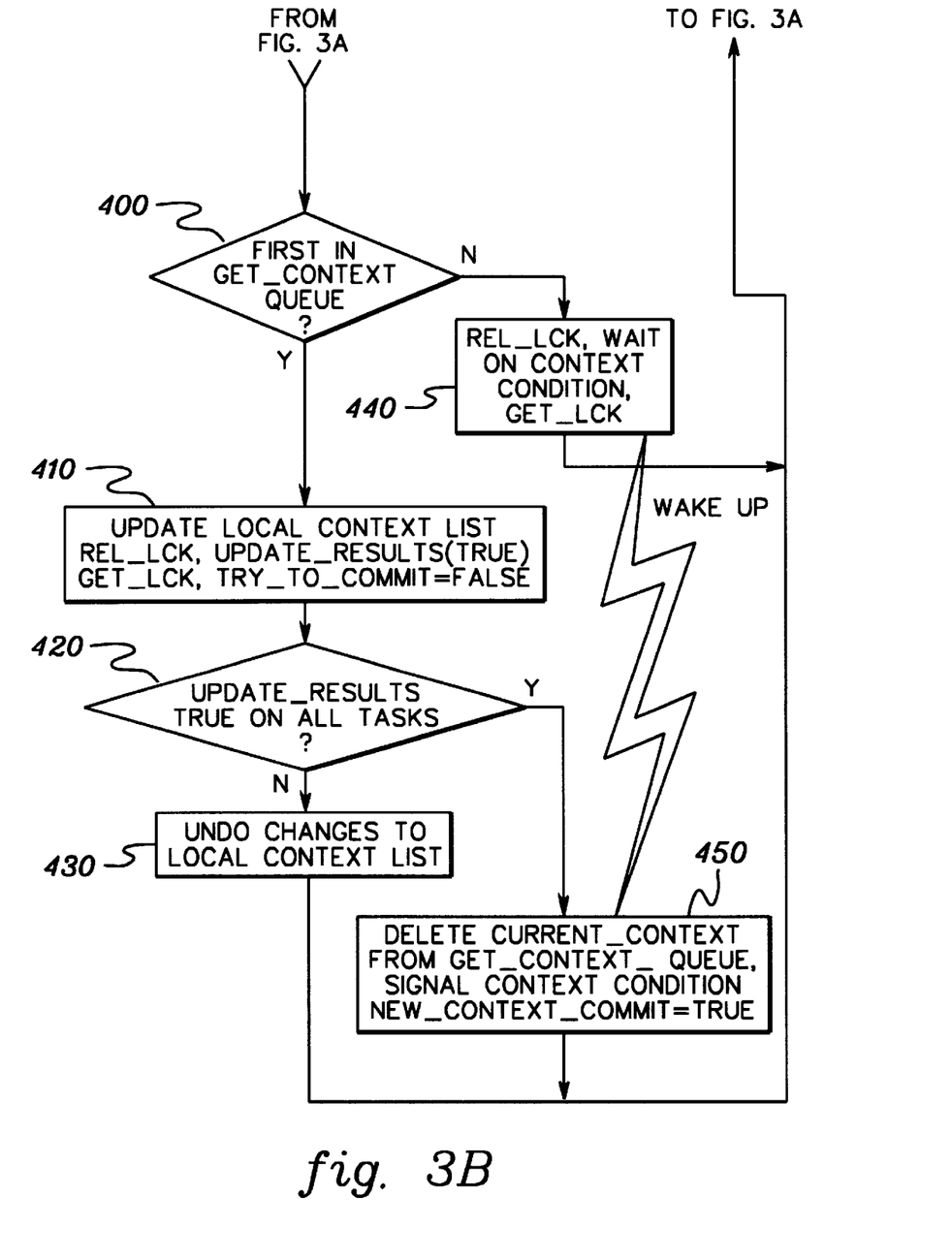

FIGS. 3A & 3B depict a more detailed embodiment of a deterministic approach for establishing a communicator across multiple processes in a multithreaded computer environment in accordance with the principles of the present invention. It should be noted that this same flow of control (FIGS. 3A & 3B) would run on all processes in the computational domain. The local context_list is the list of free context identifiers available on the local process. The find_candidate_context(temp_list) function finds a context ID that is available on all processes. The update_results(value) function returns TRUE if value is true on all processes, otherwise FALSE is returned. If there are two threads simultaneously attempting to obtain a new context identifier, one thread will end in a wait state.

Referring to FIG. 3A, processing receives as input the current_context 300 which is the context identifier of the current communicator from which the call is made for a new communicator. Next, a lock is obtained, a new_context_commit flag is set FALSE, and a current_context identifier is added to the get context queue (i.e., priority queue) 310.

Processing then inquires whether the new _context_commit flag is TRUE 320, and if so, releases the lock and returns the candidate identifier as the new context identifier, thereby establishing the communicator and ending the processing 330. Assuming that the new_context_commit flag is not true, then a list of valid context IDs (temp context_list) is established, the lock is released, a new context identifier is found (find candidate context (temp_list)), after which the lock is reobtained, and the try_to_commit flag is set TRUE 340. The find_candidate_context(temp_list) is a subroutine which implements an allreduce operation that will find a new context identifier that is valid on all processes over this particular communicator. Next, inquiries made whether the try_to_commit flag is TRUE 350. If no, then processing returns to inquire whether the new_context_commit flag is TRUE 320. Otherwise, inquiry is made whether the new_context (i.e., candidate identifier) is in the local context list (the process's available context list) 360. If no, then the lock is released, the update_results routine returns a FALSE value, the lock is reacquired and the try_to_commit flag is set FALSE 370. Processing then returns to inquiry 350 as shown.

Referring to FIG. 3B, if the new_context is in the local context list, then processing inquires whether the thread has priority in the priority queue, i.e., is first in the get_context queue 400. If no, then the lock is released, and the thread waits on a context condition after which the lock is reacquired 440. The wait on context condition would be a wait for a signal from a thread with higher priority in the queue. Thereafter, processing returns to ascertain whether the try_to_commit flag is TRUE 350 (FIG. 3A).

If the thread has priority in the get context queue, then processing updates the process's available context identifier list (i.e., removes the candidate context ID from the list), releases the lock, sends an update_results TRUE signal to the other participating threads, reacquires the lock, and sets the try_to_commit flag FALSE 410. Next, processing inquires whether the update_results is true on all processes 420. This inquiry determines whether all processes have successfully updated their local context identifier queue by removing the candidate context identifier. If no, then each process which has updated its local context identifier list must undo changes to the local context list 430 and return to inquire whether the true_to_commit flag is TRUE 350 (FIG. 3A). Assuming that all processes have updated their available context identifier lists, then the current_context is deleted from the priority queue (i.e., get_context_queue), a context condition is signaled, and the new_context_commit flag is set TRUE 450. The signaling of the context condition wakes up any waiting thread in the priority queue 440. Processing returns to inquire whether the try_to_commit flag is TRUE 350 and proceeds as described above.

By way of further explanation, pseudocode for one embodiment of processing in accordance with the principles of the present invention is provided below.

In this pseudocode, note that mpi_allreduce(X) is a library routine which performs a reduction operation (e.g., SUM, BITWISE) on the set of X values provided by the processes participating in the call, and distributes the results to all processes in the set. This is an existing library function which is used to perform the communication phase of the algorithm below.

```
function get_new_context( input_domain )
{
  context_committed = false
    while ( context_committed is false ) {
    make local copy of global_context_list
    unlock R
    mpi_allreduce( local copy of context list )      /* produces a candidate id and ensures that all
    lock R                                              processes are participating */ trying_to_commit = true
    if( not in commit_list_priority_queue )
      insert context id of input_domain into priority queue, in sorted order
    while ( trying_to_commit is true ) {
      if ( candidate context id is still available in the global_context_list )
        context_result = good
      else context_result = bad
      if ( context_result is bad) {
        unlock R
        mpi_allreduce( context_result )              /*tell peers our local result and get theirs */
        lock R
        trying_to_commit = false
      }                                              /* must get a fresh candidate */
      else {
        if( first in commit_list_priority_queue ) {
          update the global_context_list
          unlock R                                   /* claim the candidate context id at this
          mpi_allreduce( context_result )            process */
          lock R                                     /* tell peers our local result and gets theirs */
          trying_to_commit = false
          if ( context_result is bad )
            back out update to global_context_list   /* result of mpi_allreduce - some peer failed
          else {                                     to claim the context id */
            delete my id from the commit_list_priority_queue   /* all peers succeeded in claiming the context
            signal the Commit_Context condition      id */
            context_committed = true                 /* wake up the waiting threads */
          }
        }
        else {
          unlock R                                   /* not first in line, so wait */
          wait on the Commit_Context condition
          lock R
        }
      }
    }
  }
  return the committed context id
```

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order; or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for establishing a communicator across multiple multithreaded processes in a distributed computer environment wherein multiple threads may be simultaneously trying to establish communicators, said method comprising:
   (i) peer-to-peer communicating across said multiple multithreaded processes of the distributed computer environment to establish a candidate identifier for said communicator for a group of participating threads spread over said multiple processes of the distributed computer environment; and
   (ii) peer-to-peer communicating across said multiple multithreaded processes of the distributed computer environment to check at each participating thread of the group of participating threads of said multiple processes whether the candidate identifier can be claimed at its process, and if so, claiming the candidate identifier as a new identifier thereby establishing said communicator.

2. The method of claim 1, further comprising placing each participating thread into a priority queue at its process based on said participating thread's existing identifier, and using said priority queues during said communicating (ii) to avoid deadlock between multiple threads of different groups of participating threads attempting to establish communicators.

3. The method of claim 2, wherein said checking at each participating thread further comprises allowing a thread with a highest defined priority to claim said candidate identifier at its process, said thread with the highest defined priority being ascertained from said priority queue.

4. The method of claim 1, wherein said communicating (ii) further comprises reporting results of said checking at each participating thread to other participating threads of said group of participating threads.

5. The method of claim 1, wherein said communicating (i) comprises checking a local candidate identifier list at each process of said multiple processes to establish said candidate identifier for said communicator.

6. The method of claim 1, wherein if said communicating (ii) fails to establish said communicator, said method further comprises repeating said communicating (i) to establish a new candidate identifier, and repeating said communicating (ii) for said new candidate identifier.

7. The method of claim 1, wherein said communicating (i) and said communicating (ii) are implemented by a subroutine call within an MPI library, and wherein said candidate identifier comprises a candidate context identifier.

8. The method of claim 1, wherein said communicating (i) ensures that all processes of said multiple processes are participating in establishing said communicator, and wherein said communicating (ii) comprises for each participating thread, inserting the thread's current identifier into a priority queue which is global to said thread's process, and wherein said communicating (ii) further comprises allowing a thread which has made a request for a communicator under a highest priority current identifier as listed in said priority queue to be allowed to claim its candidate identifier as said new identifier.

9. The method of claim 1, wherein said communicating (ii) further comprises claiming the candidate identifier if the participating thread has priority in a priority queue maintained at its process, and if so, claiming said candidate identifier as said new identifier by removing the candidate identifier from a local identifier list of candidate identifiers maintained at said process.

10. The method of claim 9, wherein when said candidate identifier cannot be claimed at a process of said multiple processes, said communicating (ii) further comprises backing out of any update by a then participating thread of its process's local identifier list.

11. The method of claim 1, wherein the communicator comprises a message passing interface communicator.

12. A system for establishing a communicator across multiple multithreaded processes in a distributed computer environment wherein multiple threads may be simultaneously trying to establish communicators, said system comprising:
   (i) means for peer-to-peer communicating across said multiple multithreaded processes of the distributed computer environment to establish a candidate identifier for said communicator for a group of participating threads spread over said multiple processes of the distributed computer environment; and
   (ii) means for peer-to-peer communicating across said multiple multithreaded processes of the distributed computer environment to check at each participating thread of the group of participating threads of said multiple processes whether the candidate identifier can be claimed at its process, and if so, claiming the candidate identifier as a new identifier thereby establishing said communicator.

13. A The system of claim 12, further comprising means for placing each participating thread into a priority queue at its process based on said participating thread's existing identifier, and means for using said priority queues during said means for communicating (ii) to avoid deadlock between multiple threads of different groups of participating threads attempting to establish communicators.

14. The system of claim 13, wherein said checking at each participating thread further comprises means for allowing a thread with a highest defined priority to claim said candidate identifier at its process, said thread with the highest defined priority being ascertained from said priority queue.

15. The system of claim 12, wherein said means for communicating (ii) further comprises means for reporting results of said checking at each participating thread to other participating threads of said group of participating threads.

16. The system of claim 12, wherein said means for communicating (i) comprises means for checking a local candidate identifier list at each process of said multiple processes to establish said candidate identifier for said communicator.

17. The system of claim 12, wherein if said means for communicating (ii) fails to establish said communicator, said system further comprises means for repeating said means for communicating (i) to establish a new candidate identifier, and for repeating said means for communicating (ii) for said new candidate identifier.

18. The system of claim 12, wherein said means for communicating (i) and said means for communicating (ii) are implemented by a subroutine call within an MPI library, and wherein said candidate identifier comprises a candidate context identifier.

19. The system of claim 12, wherein said means for communicating (i) ensures that all processes of said multiple processes are participating in establishing said communicator, and wherein said means for communicating (ii) comprises for each participating thread, means for inserting the thread's current identifier into a priority queue which is global to said thread's process, and wherein said means for communicating (ii) further comprises means for allowing a thread which has made a request for a communicator under a highest priority current identifier as listed in said priority queue to be allowed to claim its candidate identifier as said new identifier.

20. The system of claim 12, wherein said means for communicating (ii) further comprises means for claiming the candidate identifier if the participating thread has priority in a priority queue maintained at its process, and if so, for claiming said candidate identifier as said new identifier by removing the candidate identifier from a local identifier list of candidate identifiers maintained at said process.

21. The system of claim 20, wherein when said candidate identifier cannot be claimed at a process of said multiple processes, said means for communicating (ii) further comprises means for backing out of any update by a then participating thread of its process's local identifier list.

22. The system of claim 12, wherein the communicator comprises a message passing interface communicator.

23. A multiprocess, multithreaded, distributed computer environment comprising:
at least one computing unit adapted to allow establishing of a communicator across multiple multithreaded processes of the distributed computer environment notwithstanding that multiple threads may be simultaneously trying to establish communicators, said establishing proceeding without deadlocking, wherein said at least one computing unit is adapted to:
(i) peer-to-peer communicate across said multiple multithreaded processes of the distributed computer environment to establish a candidate identifier for said communicator for a group of participating threads spread over said multiple processes of the distributed computer environment; and
(ii) peer-to-peer communicate across said multiple multithreaded processes of the distributed computer environment to check at each participating thread of the group of participating threads of said multiple processes whether the candidate identifier can be claimed at its process, and if so, claiming the candidate identifier as a new identifier thereby establishing said communicator.

24. At least one program storage device readable by a machine, tangibly embodying at least one program of instructions executable by the machine to perform a method for establishing a communicator across multiple multithreaded processes in a distributed computer environment wherein multiple threads may be simultaneously trying to establish communicators, said method comprising:
(i) peer-to-peer communicating across said multiple multithreaded processes of the distributed computer environment to establish a candidate identifier for said communicator for a group of participating threads spread over said multiple processes of the distributed computer environment; and
(ii) peer-to-peer communicating across said multiple multithreaded processes of the distributed computer environment to check at each participating thread of the group of participating threads of said multiple processes whether the candidate identifier can be claimed at its process, and if so, claiming the candidate identifier as a new identifier thereby establishing said communicator.

25. The at least one program storage device of claim 24, further comprising placing each participating thread into a priority queue at its process based on said participating thread's existing identifier, and using said priority queues during said communicating (ii) to avoid deadlock between multiple threads of different groups of participating threads attempting to establish communicators.

26. The at least one program storage device of claim 25, wherein said checking at each participating thread further comprises allowing a thread with a highest defined priority to claim said candidate identifier at its process, said thread with the highest defined priority being ascertained from said priority queue.

27. The at least one program storage device of claim 24, wherein said communicating (ii) further comprises reporting results of said checking at each participating thread to other participating threads of said group of participating threads.

28. The at least one program storage device of claim 24, wherein said communicating (i) comprises checking a local candidate identifier list at each process of said multiple processes to establish said candidate identifier for said communicator.

29. The at least one program storage device of claim 24, wherein if said communicating (ii) fails to establish said communicator, said method further comprises repeating said communicating (i) to establish a new candidate identifier, and repeating said communicating (ii) for said new candidate identifier.

30. The at least one program storage device of claim 24, wherein said communicating (i) and said communicating (ii) are implemented by a subroutine call within an MPI library, and wherein said candidate identifier comprises a candidate context identifier.

31. The at least one program storage device of claim 24, wherein said communicating (i) ensures that all processes of said multiple processes are participating in establishing said communicator, and wherein said communicating (ii) comprises for each participating thread, inserting the thread's current identifier into a priority queue which is global to said thread's process, and wherein said communicating (ii) further comprises allowing a thread which has made a request for a communicator under a highest priority current identifier as listed in said priority queue to be allowed to claim its candidate identifier as said new identifier.

32. The at least one program storage device of claim 24, wherein said communicating (ii) further comprises claiming the candidate identifier if the participating thread has priority in a priority queue maintained at its process, and if so, claiming said candidate identifier as said new identifier by removing the candidate identifier from a local identifier list of candidate identifiers maintained at said process.

33. The at least one program storage device of claim 32, wherein when said candidate identifier cannot be claimed at a process of said multiple processes, said communicating (ii) further comprises backing out of any update by a then participating thread of its process's local identifier list.

34. The at least one program storage device of claim 24, wherein the communicator comprises a message passing interface communicator.

* * * * *